F. B. COOK.
CABLE TERMINAL.
APPLICATION FILED JUNE 22, 1908.
913,264.
Patented Feb. 23, 1909.
2 SHEETS—SHEET 1.
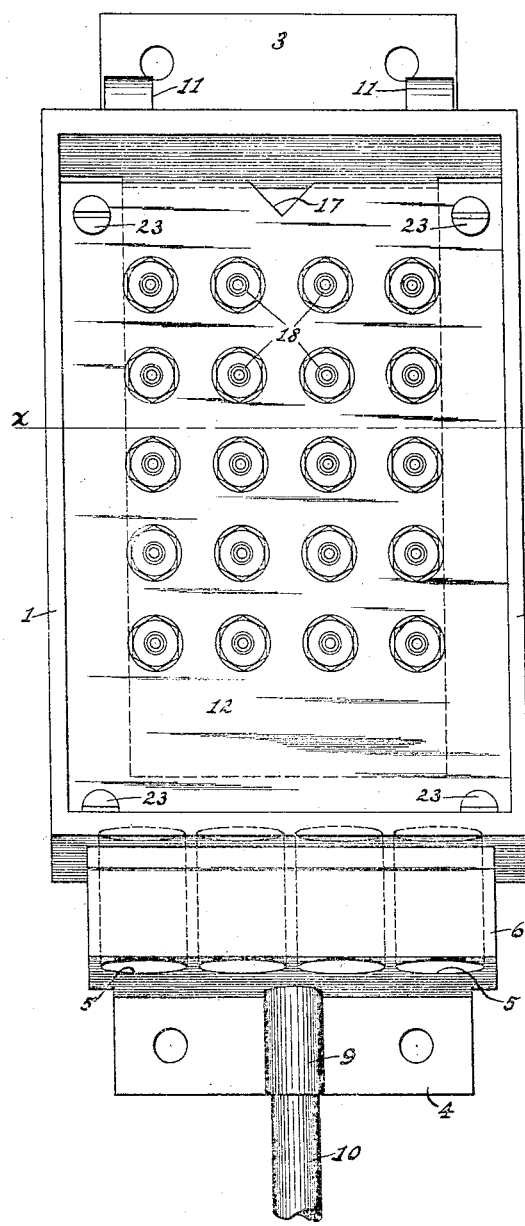
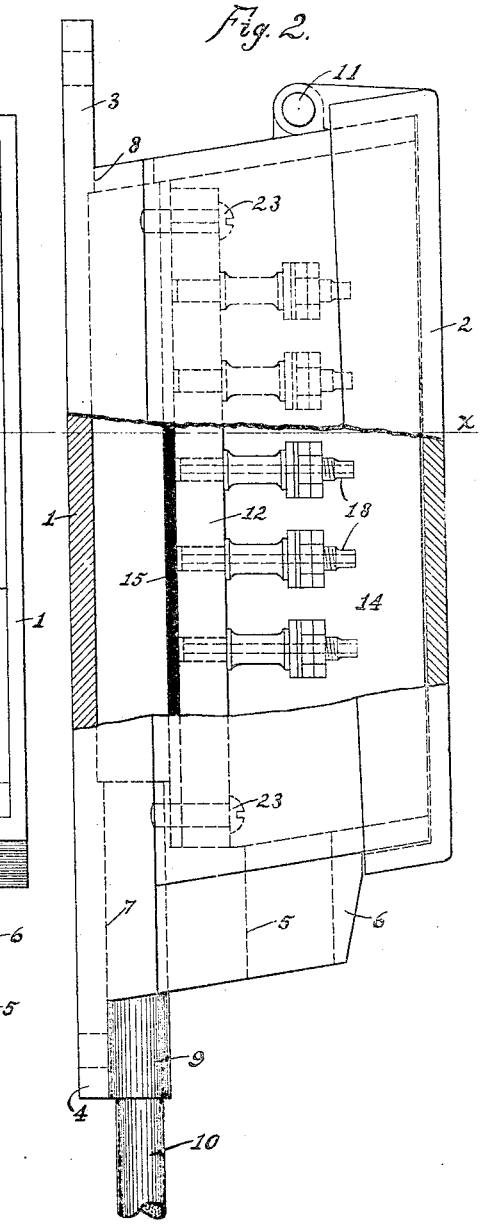
WITNESSES: Frederick R. Parker. Clarence E. Cook.
INVENTOR: Frank B. Cook.

F. B. COOK.
CABLE TERMINAL.
APPLICATION FILED JUNE 22, 1908.
913,264
Patented Feb. 23, 1909.
2 SHEETS—SHEET 2.
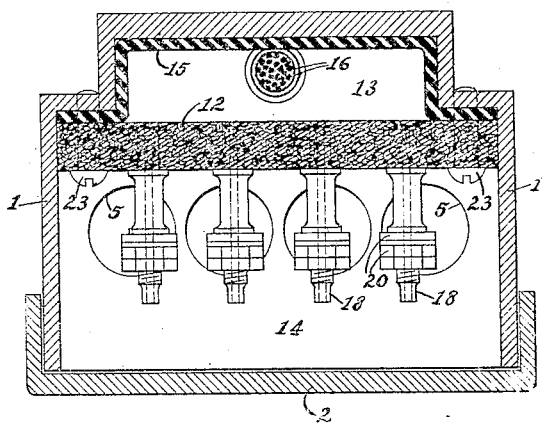
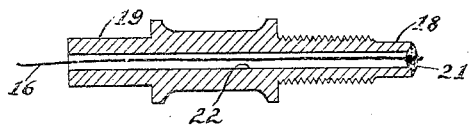
WITNESSES:
Frederick R. Parker
Clarence E. Cook
INVENTOR:
Frank B. Cook

UNITED STATES PATENT OFFICE.

FRANK B. COOK, OF CHICAGO, ILLINOIS.

CABLE-TERMINAL.

No. 913,264.

Specification of Letters Patent.

Patented Feb. 23, 1909.

Application filed June 22, 1908. Serial No. 439,785.

*To all whom it may concern:*

Be it known that I, FRANK B. COOK, a citizen of the United States of America, residing at Chicago, in the county of Cook and State of Illinois, have invented a new and useful Cable-Terminal, of which the following is a specification, reference being had to the accompanying drawings, illustrating same.

My invention relates to terminal heads for distributing the conductors of electrical cables and connecting such conductors with aerial wires.

The principal objects of my invention are to provide general improvements in such a cable terminal, and to provide improved means for accommodating the cable and aerial conductors leading to the terminal and for suitably connecting the said conductors together.

Other objects will be apparent from the following specification.

In the accompanying drawings illustrating my present invention, Figure 1 is a front elevation of the cable terminal of the invention, with the front lid or cover removed; Fig. 2 is a side elevation of the complete cable terminal, with a portion of the box and cover removed to show the interior construction; Fig. 3 is a transverse cross-sectional view of the cable terminal, taken on plane *x x* of Figs. 1 and 2; and Fig. 4 is a longitudinal cross-sectional view of one of the connection terminals or binding posts used in the cable terminal.

Like characters refer to like parts in the several figures.

In the drawings, 1 is an iron box, 2 is a lid or cover on the front of the box for closing the latter, 3 and 4 are lugs on the top and bottom of the rear portion of the box 1 for mounting the whole to a suitable support, 5 5 are openings through the thick bottom portion 6 of the box through which openings the aerial conductors extend into the box 1, and 7 and 8 are openings through the bottom and top portions, respectively, of the box 1, to accommodate the end of the cable entering the box 1. The thick portion 6 on the lower end of the cable terminal is for the purpose of giving considerable length to the openings 5, 5 and thereby preventing rain from blowing up into the compartment 14 of the terminal. If the cable enters the box 1 from the bottom thereof the opening 7 is preferably supplied with a nozzle 9 for supporting the cable 10, preferably as shown. If the cable is to enter the box 1 from the top thereof the opening 8 may be supplied with a nozzle for accommodating the cable, or the cable may be extended through the opening 8 without a nozzle, as desired. The front lid 2 is hinged at 11, 11 preferably as shown, so that it may be turned upwardly and backwardly to entirely open the front portion of the box 1, the construction being such that the lid 2 will stay in this raised position and not fall down by its own weight.

In the box 1 is mounted a connection-terminal mounting strip or plate 12, by bolts 23, 23, preferably as shown in Fig. 3, so as to divide the interior portion of the box 1 into two compartments 13 and 14. This plate 12 is preferably made of asbestos board which is very suitable for this purpose. Around the back edge of the plate 12 and clear around the compartment 13 of box 1 is placed a layer of insulating material 15, preferably felt, which forms a gasket or cushion for the plate 12 and also keeps the cable conductors 16 away from the iron box 1. The top portion of the plate 12 is preferably cut away as at 17 to provide an opening for filling the compartment 13 of the box 1 with any suitable insulating compound or material, if desired. The top portion of the box 1 is preferably sloped downwardly toward the rear of the box so as to prevent rain from running toward the front edge of the box and into the latter.

In the compartment 14 of the box 1 are located a number of binding posts 18, 18, each being mounted on the plate 12 by having its rear end 19 forced into a hole in the plate 12. Each post 18 carries suitable nuts and washers 20 for attaching an aerial conductor to the post 18, the nuts and washers 20 being set out from the plate 12 as shown in Fig. 3 so that the aerial conductors entering the compartment 14 through the holes 5, 5 may be carried between the posts 18, 18 and back of the nuts and washers 20, that is, between the latter and the plate 12. This arrangement of the aerial conductors is very convenient for attaching same to the binding posts 18, 18, because they are always out of the way and do not interfere with connections being made by the nuts and washers 20, 20. Each of the binding posts 18, 18 is provided with a longitudinal hole 22 extending therethrough, through which a cable conductor 16 may be extended and soldered to the post 18 at the outer end thereof, as shown at 21 in Fig. 4. It will readily be seen how, with the aid of these binding posts, the cable conductors are connected with the aerial conductors.

The circuit conductors extending through the cable terminal enter the latter from the cable 10, then extend through the compartment 13 and through the openings 22, 22 in the posts 18 18, being soldered to the latter as at 21 in Fig. 4, and then extend from the nuts and washers 20, 20 back between the posts 18 18 and between the nuts and washers 20, 20 and the plate 12, down through the openings 5, 5 in the lower end of the box portion 1, to the aerial conductors of the system.

I do not wish to limit this invention to all of the particular details of construction herein shown, as various modifications may be made in same without departing from the scope of the appended claim.

What I claim as my invention is:

A cable terminal of the character described comprising a cast box portion having a front lid or cover, said casting projecting at its lower end below the box portion and having passages through the said projecting end into the box portion for accommodating aerial conductors, said projecting end preventing rain or moisture from blowing through the said passages into the box portion, a partition in the box portion dividing the latter into front and rear compartments for aerial and cable conductors respectively, hollow binding posts carried by the said partition and located in the front compartment, means for accommodating a cable entering the said rear compartment of the box portion, the cable conductors extending through the said partition and through the said binding posts and being secured to the forward ends of the said posts by solder, nuts and washers on the said posts for connecting the aerial conductors thereto, each binding post having a shoulder thereon to position the said nuts and washers away from the said partition whereby the said aerial conductors may be carried between the said posts back of the said nuts and washers.

As inventor of the foregoing I hereunto subscribe my name in the presence of two subscribing witnesses, this 18th day of June, 1908.

FRANK B. COOK.

Witnesses:
FREDERICK R. PARKER,
CLARENCE E. COOK.